3,362,832
GELATIN FORMULATION METHOD
Nicholas J. Kalafatas, Arlington, Robert M. Ehrlich, Woburn, and Robert B. Huntoon, Saugus, Mass., assignors to General Foods Corporation, White Plains, N.Y., a corporation of Delaware
No Drawing. Filed May 27, 1963, Ser. No. 283,604
4 Claims. (Cl. 99—134)

This invention relates to a composition employing gelatin as a principal ingredient thereof and to a process for preparing the composition. More specifically, it relates to a novel gelatin composition and process whereby a gelatin having superior whipping qualities is produced.

Gelatin is a conventional ingredient in products such as marshmallows where it finds use because of its foaming and stabilizing qualities which produce a high degree of overrun and low density to form an acceptable product. Drawbacks to the use of gelatin, alone, have long been known and it has already been proposed that certain salts, namely, phosphates, be used in combination with the gelatin in a marshmallow formula to product a product that will have lower density and a higher degree of overrun. For example, U.S. Patent No. 2,196,300 to Grettie proposes to treat gelatin by the addition of hydrates of phosphorus pentoxide and salts of those hydrates, as well as molybdates, tungstates, phosphomolybdates and phosphotungstates. Naturally, only the phosphorus compounds are intended for edible uses. Among the compounds specifically disclosed in that patent as being suitable for use with gelatin are metaphosphates, orthophosphates and ultraphosphates and, more specifically, sodium hexametaphosphate.

While the use of the compounds suggested by Grettie in combination with gelatin ameliorate the whipping properties of the gelatin, it has now been discovered that such whipping properties can be improved still further when either a soluble alkali metal sulfate or ammonium sulfate is also combined with the phosphate and the gelatin. More particularly, it has been found desirable to employ in combination with the gelatin a polyphosphate such as ammonium polyphosphate or sodium hexametaphosphate and, further, to employ ammonium sulfate or sodium sulfate in order to derive superior whipping qualities in a marshmallow formula formed therefrom and an improved marshmallow product.

Marshmallow formulations in accordance with the present invention exhibit properties, particularly in extrusion techniques of forming marshmallows, which are readily apparent. The use of sulfates in combination with gelatin and phosphates results in faster setting rates for extruded marshmallows as well as lower densities in those marshmallows. The increased setting rates means that the rope in the form of which the marshmallow is extruded and then dusted can be cut and packaged in a shorter period of time after actual extrusion. Further, after cutting, a marshmallow product produced in accordance with the present invention will have a quicker recovery to proper shape after cutting and packaged marshmallows will not tend to adhere to each other as is the case with marshmallows produced from gelatin alone. Tests which have been carried out show that the whipping properties of gelatin as used in a marshmallow formulation are improved when a phosphate is added to the gelatin and improved still further when a sulfate is added to the gelatin and the phosphate.

The phosphates which are suitable for use in the present invention are all those that have been described in the aforesaid U.S. Patent No. 2,196,300. Thus both simple and complex phosphates are suitable for use, although polyphosphates are preferred. The phosphorus-containing composition may also be present in the form of the free acid, although there are obvious advantages in the use of phosphates as opposed to strong, liquid acids. However, meta, ortho, pyro, tri, tetra, penta, hexa, etc., phosphoric acids and their salts may all be used, the limitation being that they be hydrates of phosphorus pentoxide in all stages of complexity and the salts of those hydrates. While sodium hexametaphosphate is a commonly available salt of a hydrate of phosphorus pentoxide, it has also been found that ammonium polyphosphate, which is preferably formed by the action of ammonium hydroxide on polyphosphoric acid, is especially useful in providing a superior gelatin composition suitable for use in a marshmallow mix.

The sulfate which is used with the gelatin and the phosphate in accordance with the present invention must be water soluble, and alkali metal sulfates as well as ammonium sulfates are preferred. In particular, it has been found advantageous to use ammonium sulfate, although soluble alkali metal sulfates can be utilized.

While the present composition of matter is not intended to be limited to any particular quantities of phosphates and sulfates, appreciable quantities of both having been found to give desired results, certain ranges of quantities of phosphates and sulfates have been found most beneficial in producing the desired improvements. Thus, phosphates are used in amounts such that they constitute from about 1.4 to 4.3% of the gelatin-salt combination. This percentage is calculated by basing the percentage of phosphorus pentoxide in polyphosphoric acid at about 82 to 84% by weight. The sulfate will be used in quantities of about 1.4 to 4.1% by weight of the gelatin-salt combination. The preferred amounts of ammonium polyphosphate and ammonium sulfate are, respectively, about 2.9% and 2.5% by weight. The remainder of the gelatin-salt combination will be made up of gelatin. By the term "gelatin" it is meant to refer to conventional gelatin as manufactured, which usually contains about 7 to 12% moisture. Consequently, although the above percentages are referred to as being on a dry weight basis, the inherent moisture of the gelatin has been included in that basis. The only restriction on the quantities of salts used is that they shall not be so great as to cause the gelatin to precipitate from its aqueous solution to be added to the sugar syrup in the marshmallow mix.

The use of ammonium polyphosphate in conjunction with gelatin and ammonium sulfate is a particularly effective example of an improved gelatin product in accordance with our invention. It is a specific feature of that invention that the ammonium polyphosphate be prepared by first forming an aqueous solution of polyphosphoric acid and then slowly adding concentrated ammonium hydroxide to the acid solution while maintaining the temperature of the reaction medium at less than 100° F., preferably at less than 90° F. It is particularly desirable to partially neutralize the polyphosphoric acid solution until the pH thereof rises to a range of about 4.6 to 4.7. This will result in a product which is an ammonium acid polyphosphate, the precise formula of which has not been exactly determined. However, as referred to hereinafter and hereinbefore, that term is meant to refer to a composition which may be entirely ammonium polyphosphate or which also may be a partially neutralized polyphosphoric acid such that it would normally be classified as an ammonium acid polyphosphate. While the precise degree of neutralization of the polyphosphoric acid by the ammonium hydroxide is not intended to be a critical feature, it has been found that most preferred results are obtained when the polyphosphoric acid has been partially neutralized to the above mentioned pH of 4.6 to 4.7. Prior to partial neutralization, the polyphosphoric acid is generally diluted with water. By polyphosphoric acid it is meant to refer to a clear, colorless, viscous, hygroscopic liquid which has a $P_2O_5$ content of between 82 and 84%. The specific gravity at 83% $P_2O_5$ is 2.060 at 20° C.

After the ammonium polyphosphate which has been found particularly effective in a gelatin-salt combination with ammonium sulfate has been formed, it may then be combined in any suitable manner with gelatin and ammonium sulfate, preferably in the quantities indicated hereinbefore. After that combination, the so-formed solution is transformed to a solid state, for example, by being chilled and then dried and comminuted to a desired mesh. The gelatin-phosphate-sulfate particles may then be used directly in a marshmallow mix or may be added to and mixed with a desired quantity of gelatin which does not contain phosphates and sulfates in order that the blended gelatin compositions will then be suitable for use in a marshmallow mix.

The present invention will be better understood by reference to the following specific examples of the method and product produced in accordance therewith.

EXAMPLE I

This example illustrates the preparation of ammonium polyphosphate and the subsequent formation of a solid gelatin combination utilizing ammonium polyphosphate.

Liquid polyphosphoric acid containing about 82 to 84% $P_2O_5$ was obtained and 2.975 pounds of the polyphosphoric acid was added to 2.734 gallons of cold water in a jacketed kettle cooled by circulating water. Concentrated liquid ammonium hydroxide was then slowly added to the polyphosphoric acid solution, the rate of addition being such that the temperature of the cooled liquid did not rise above 80° to 90° F. The ammonium hydroxide was added until the pH of the solution was 4.6.

In a separate preparation, 43.38 pounds of gelatin and 3.64 pounds of ammonium sulfate were added to 199.92 pounds of water preheated to 140° F., the water being sufficient to make 24 gallons of a 17.56% gelatin solution. The mixture was stirred until solution had been effected. The gelatin-sulfate solution was then cooled to a temperature of 110° F. and the previously prepared unheated ammonium polyphosphate solution slowly added to it with the temperature of the reaction solution being maintained at less than 100° F. After all the ammonium polyphosphate had been added, the resulting solution was poured into trays and chilled at refrigeration temperatures, i.e., about 42° F. After setting, the gelatin-phosphate-sulfate composition was cut into strips and dried by means of circulating warm air. It was then broken and comminuted to 40 to 50 mesh in order to form a gelatin composition suitable for use in a marshmallow mix. The so-prepared gelatin-salt composition was blended with a quantity of food grade gelatin such that the gelatin-salt composition comprised about one-third of the total, which was then suitable for use as the gelatin component of a marshmallow formulation.

EXAMPLE II

An example of a gelatin-phosphate-sulfate composition as produced in accordance with the practice of Example I is as follows, the percentages being on a dry weight basis except for the inherent moisture of 7 to 12% in commercially manufactured gelatin, which has been included with the weight of the gelatin:

| | Percent |
|---|---|
| Ammonium polyphosphate | 2.9 |
| Ammonium sulfate | 2.5 |
| Gelatin | 94.6 |
| | 100.0 |

EXAMPLE III

An example of marshmallow formulation employing the blended gelatin produced in accordance with Example I is as follows:

| | Pounds |
|---|---|
| Corn syrup (54° B.) | 38 |
| Dextrose | 17 |
| Sucrose | 34 |
| Blended gelatin | 2 |
| Water | 9 |

The ingredients were blended to form a syrup, heated, fed through a confined chamber, whipped with input air under pressure, cooled, and extruded in the conventional manner.

It will be apparent that certain alterations, substitutions and modifications in the gelatin composition and process described hereinbefore will be obvious to those skilled in the art and can be made without departing from the scope of the present invention. It is desired, therefore, that all such obvious changes be included within the purview of the present invention, which is limited only by the scope of the following, appended claims.

What is claimed is:

1. The method of preparing a gelatin composition, which includes forming an aqueous solution of polyphosphoric acid, partially neutralizing the solution to a pH of about 4.6 to 4.7 with a base selected from the group consisting of ammonium and alkali metal hydroxides, and combining the solution so formed and containing a polyphosphate with gelatin and a sulfate selected from the group consisting of ammonium sulfate and soluble alkali metal sulfates, the amount of said polyphosphate being 1.4 to 4.3% and the amount of said sulfate being 1.4 to 4.1%, basis the dry weight of gelatin, polyphosphate and sulfate.

2. The method claimed in claim 1, in which the base is ammonium hydroxide and the sulfate is ammonium sulfate.

3. The method claimed in claim 1, in which the temperature of the solution of polyphosphoric acid during partial neutralization thereof is maintained at less than 100° F.

4. The method of preparing a gelatin composition, which includes forming a solution of polyphosphoric acid, partially neutralizing the solution to a pH of about 4.6 to 4.7 with concentrated ammonium hydroxide while maintaining the temperature partially neutralized solution with an aqueous solution of gelatin and ammonium sulfate, chilling and drying the so-formed solution, and comminuting the dried composition to a desired mesh, said composition containing on a dry weight basis about 1.4 to 4.3% ammonium polyphosphate, about 1.4 to 4.1% ammonium sulfate, and the remainder gelatin.

References Cited

UNITED STATES PATENTS

| 2,196,300 | 4/1940 | Grettie | 99—130 |
| 2,519,961 | 8/1950 | Grettie | 99—130 |
| 2,844,468 | 7/1958 | Gunther | 99—130 X |
| 2,886,445 | 5/1959 | Rosenthal et al. | 99—130 X |

FOREIGN PATENTS 361,138   11/1931   Great Britain.

A. LOUIS MONACELL, *Primary Examiner.*

HYMAN LORD, *Examiner.*

J. M. HUNTER, J. M. GOLIAN, *Assistant Examiners.*